Dec. 16, 1958  K. R. BETTS ET AL  2,864,299
VEHICLE VENTILATOR
Filed Sept. 9, 1954  4 Sheets-Sheet 1
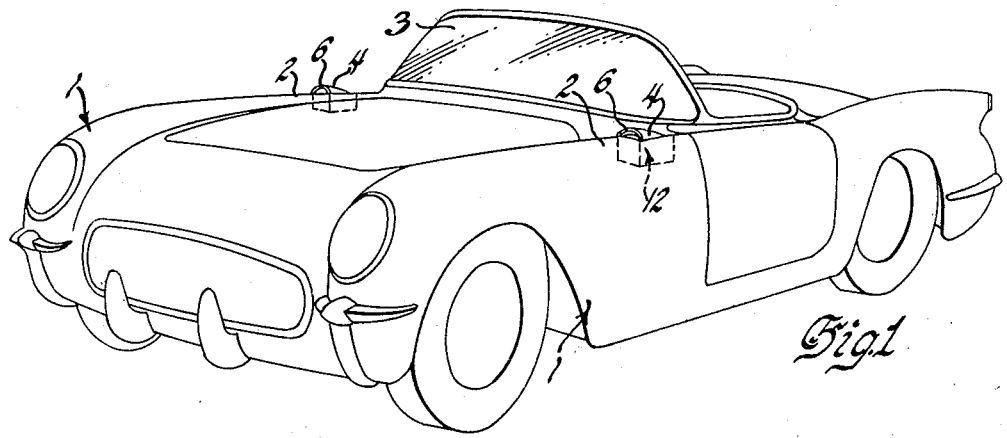
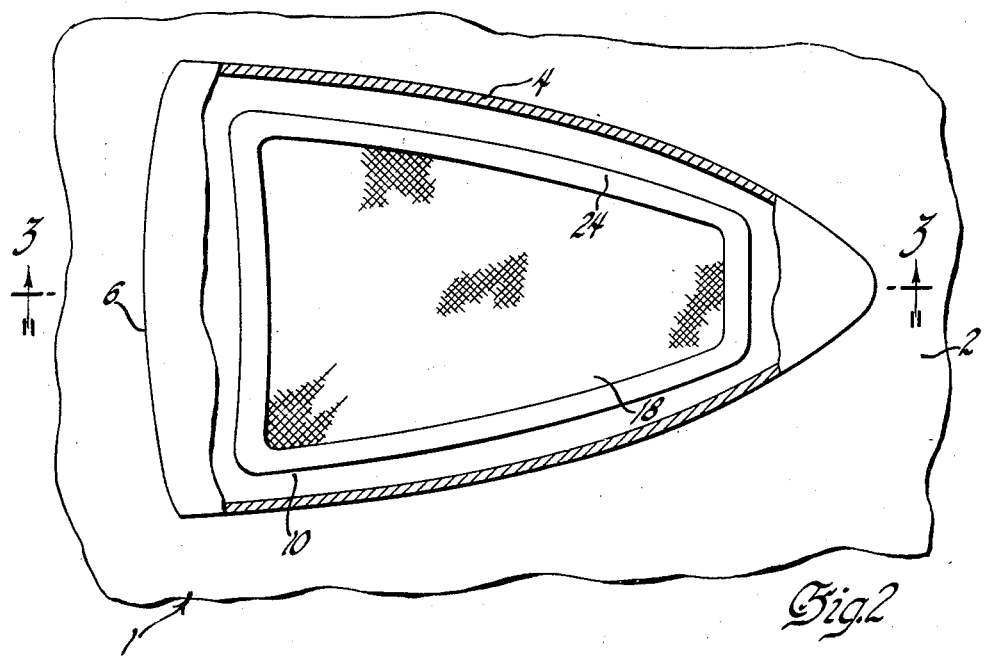
INVENTORS
Matthew R. Whitman &
BY Kenneth R. Betts
Paul Fitzpatrick
ATTORNEY

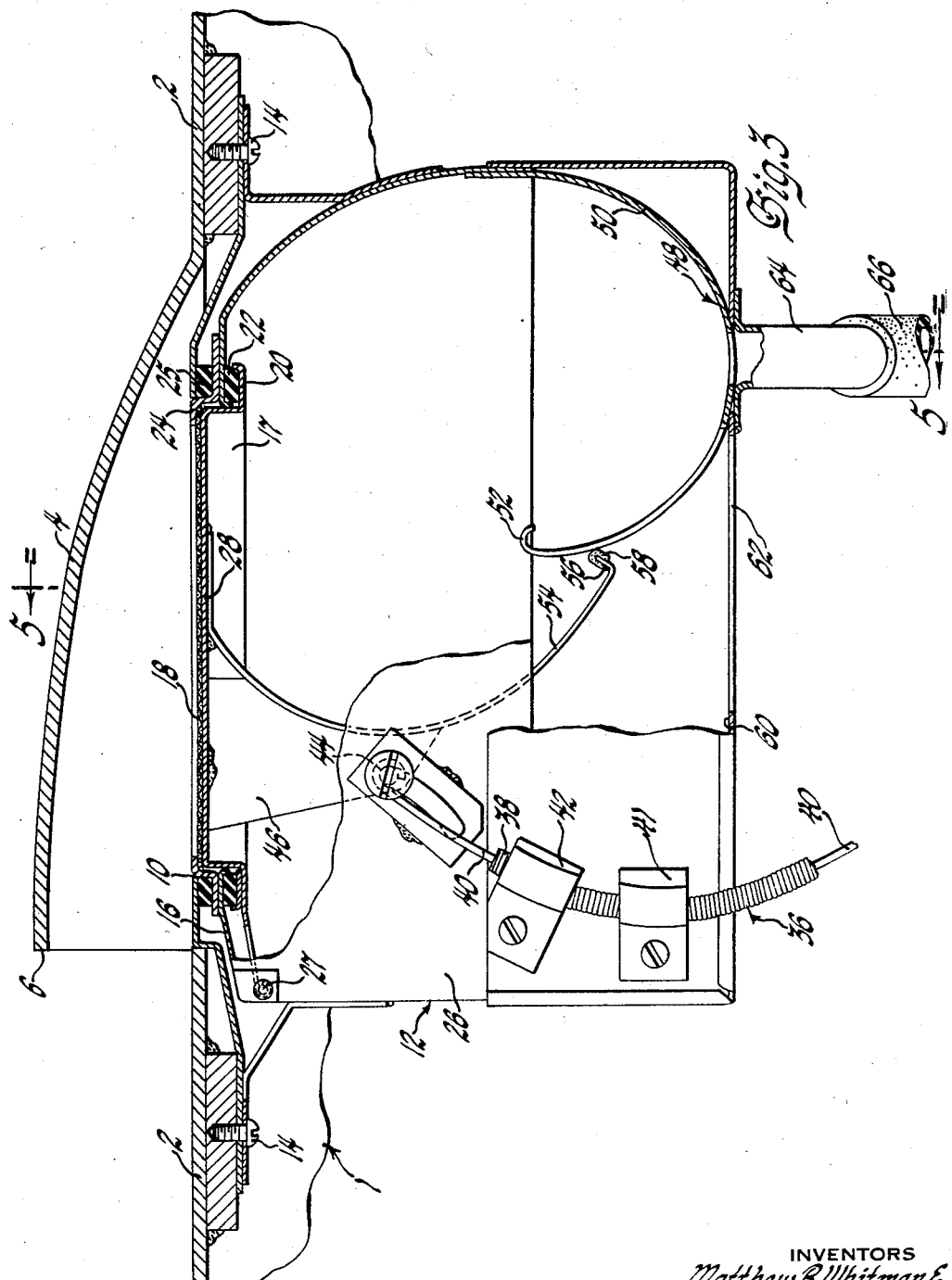

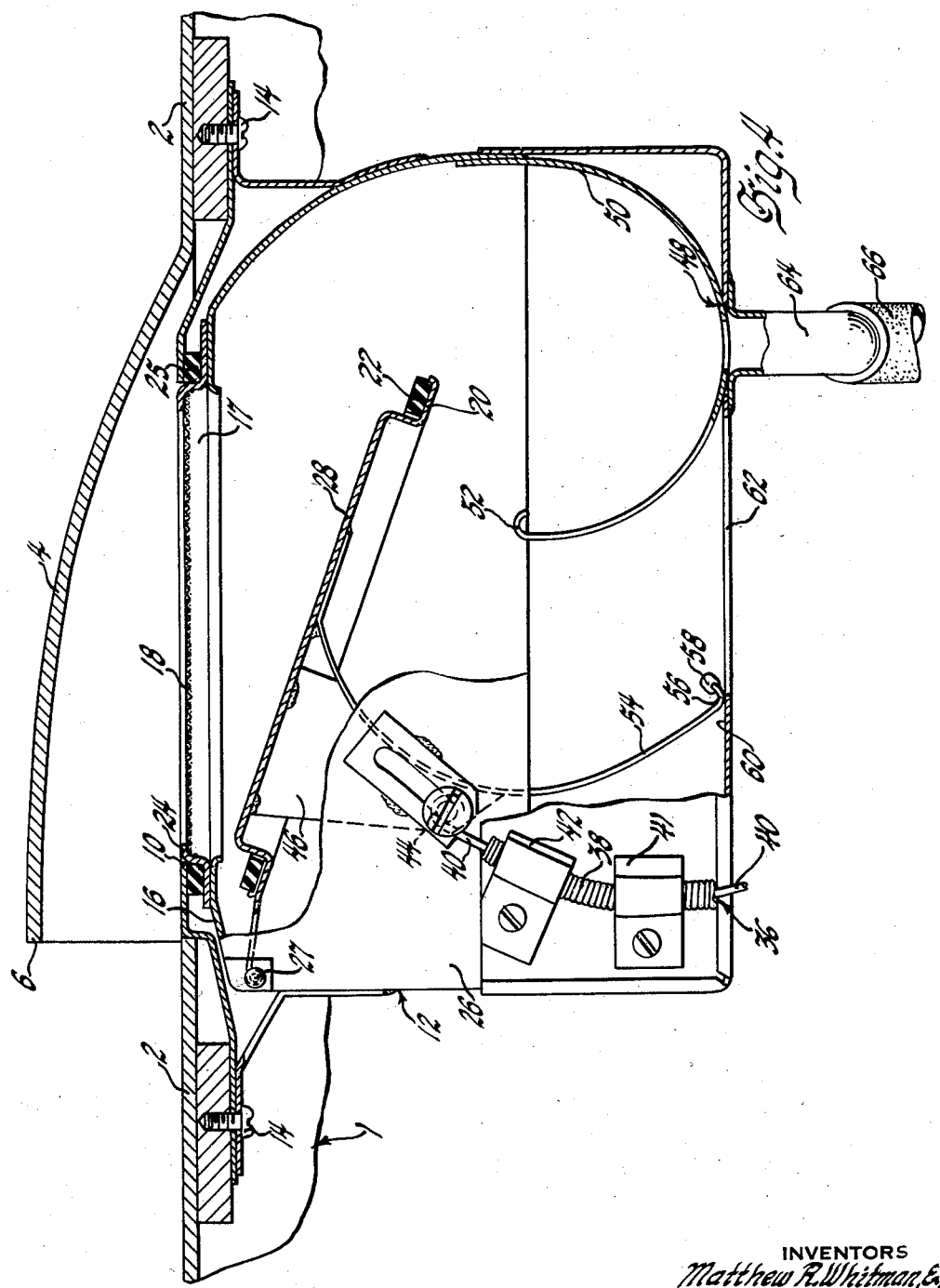

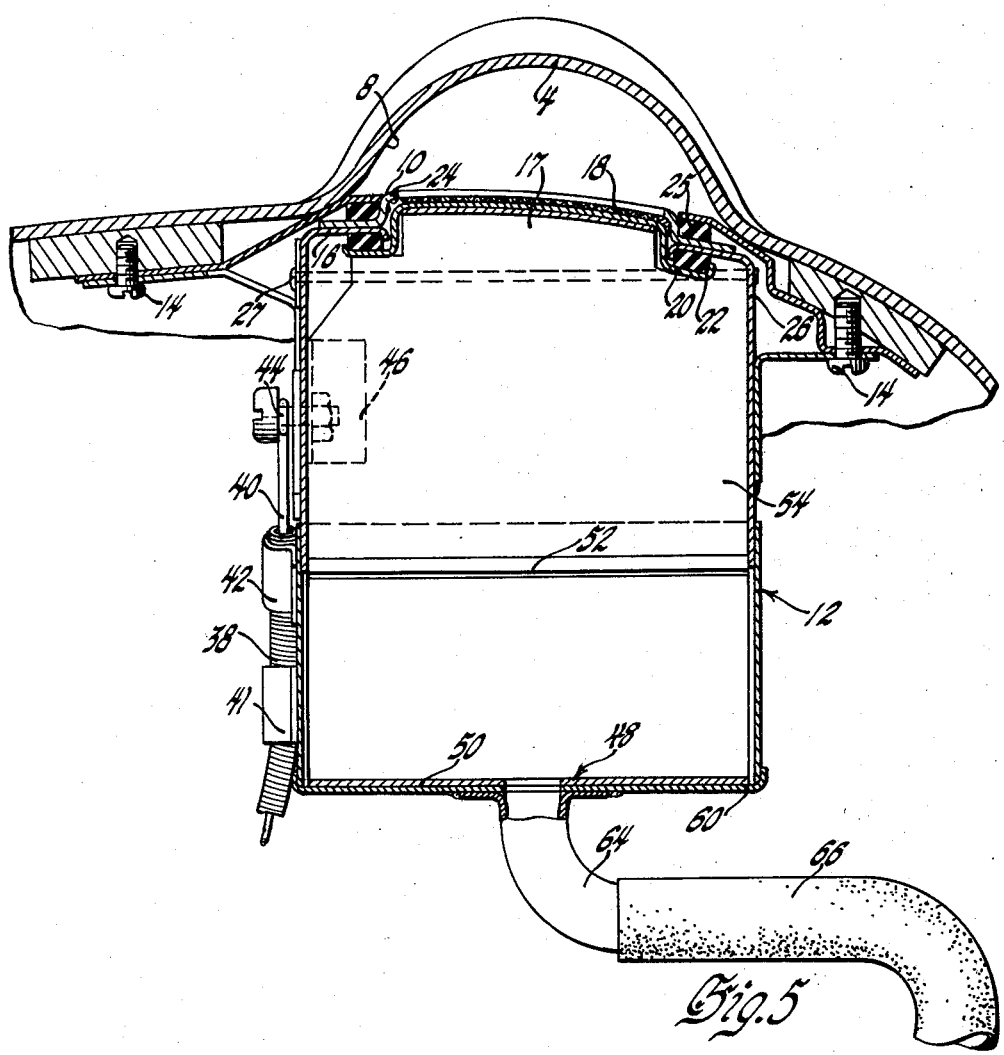

United States Patent Office 2,864,299
Patented Dec. 16, 1958

2,864,299

VEHICLE VENTILATOR

Kenneth R. Betts and Matthew R. Whitman, Detroit, Mich., assignors to General Motors Corporation, Detroit, Mich., a corporation of Delaware Application September 9, 1954, Serial No. 454,988

2 Claims. (Cl. 98—2)

This invention relates to vehicle ventilators, and more particularly, to ventilator structures adapted for disposition in vehicle fenders.

It is well known in prior art to provide ventilating apertures in the body wall of a vehicle. In the past such structures were commonly located on the engine cowl immediately forward of the windshield. However, due to space limitations incident to progressive increase in the number and size of instruments and accessories located between the engine firewall and the vehicle instrument panel, it has become progressively more difficult to utilize cowl type ventilators. Consequently, in the more recent past, ventilator intakes have been located on the front vertical wall of the vehicle body adjacent the radiator. While this type of ventilator presents no particular problem insofar as space limitations are concerned, certain functional disadvantages arise. Primary among the disadvantages of the latter type is the tendency to introduce exhaust gases into the passenger compartment. Since the intakes are aligned substantially in the path of exhaust discharge from the immediately preceding vehicle, exhaust content of air passing through the ventilators often become so great as to require closing of the ventilator entirely. This condition is particularly pronounced in large metropolitan areas where traffic is slow moving and congested. In addition to the functional disadvantage inherent in this type of ventilator, the distance between the air intake and the passenger compartment requires the installation of extensive ducting which significantly increase the cost of the system.

An object of the present invention is to provide a vehicle ventilator system wherein the air intake structure is arranged to provide optimum intake of fresh air and minimum intake of noxious gases.

Another object is to provide a ventilator construction wherein the air intakes are disposed on the upper wall of each vehicle fender in close proximity to the passenger compartment.

A further object is to provide ventilator construction of the stated character wherein the regulating mechanism therefor is mounted in the cavity formed by the rear portion of the vehicle fender.

Still another object is to provide a ventilator construction of the stated character having an upwardly extending air scoop in the fender body wall, the scoop being provided with a forwardly facing aperture perpendicular to the normal flow path of air.

A further object is to provide a structure of the stated character having a velocity trap formed therein for separating water particles from the air, and means for discharging the water exteriorly of the vehicle.

These and other objects and advantages of the invention will become more fully apparent as reference is made to the accompanying specification and drawings wherein:

Fig. 1 is a perspective view of a vehicle embodying the invention.

Fig. 2 is a partial plan view, partly in section, of a portion of the vehicle front fender, showing the form and location of the air scoop.

Fig. 3 is a sectional elevational view, showing the form and arrangement of the air scoop and adjustable closure associated therewith.

Fig. 4 is a view similar to Fig. 3, showing the closure in the open position.

Fig. 5 is a front sectional elevational view looking in the direction of arrows 5—5 of Fig. 3.

Referring now to the drawings and particularly Fig. 1, there is shown a portion of a vehicle front fender 1 wherein the upper wall 2 thereof is provided with an upwardly deformed forwardly facing integral scoop structure 4 located slightly forwardly of the vehicle windshield 3. Scoop 4 is preferably a continuation of upper wall 2 and is smoothly tapered rearwardly into the fender. While the form and arrangement of scoop 4 is ideally suited for utilization in vehicle bodies of laminated fiber glass constructions, it will be understood that this construction is equally adapted for sheet metal constructions. At its forward edge 6, scoop 4 is spaced substantially upwardly from the upper surface 2 of fender 1 and forms a generally semi-circular opening 8 which is perpendicular to the normal direction of flow of air along the fender.

Directly beneath scoop 4, upper fender wall 2 is provided with a generally rectangular opening 10. Vertically adjacent opening 10, a box-like chamber 12 is secured on the undersurface of fender wall 2 by means of machine screws 14. Along its upper edge, chamber 12 is provided with an inturned flange 16 which defines an opening 17, similar in configuration with opening 10. A wire mesh air screen 18 extends across the opening defined by flange 16. A flanged sheet metal frame 24 overlies and surrounds screen 18 and is secured to the top wall of flange 16. When box-like chamber 12 is assembled in the position shown in Fig. 1, air screen 18 and frame 24 lie in flush relation with the upper surface 2 of the vehicle body. A gasket 25 is interposed between the lower surface of body 2 and the flanged perimeter of frame 24 to prevent leakage of water around the perimeter of opening 10. Pivotally connected to the forward wall 26 of chamber 12 at 27 is a sheet metal flap or closure 28. Closure 28 is formed with a continuous downwardly offset perimetral flange 20 which is similar in configuration to the opening formed by flange 16 of chamber 12 and is vertically swingable upwardly to close the opening and prevent entrance of air through scoop 4 into chamber 12. To assure an air-tight seal around closure 28, offset flange 20 is provided with a continuous resilient gasket 22 which compressibly engages the lower surface of flange 16 when closure 28 is in the closed position.

To regulate the angular position of closure 28 between open and closed positions, there is provided a Bowden cable mechanism 36. Cable mechanism 36 comprises a sheath 38 and a wire drive member 40 which is linearly movable therein. One end of cable 36 is secured at a suitable point in the driving compartment of the vehicle, not shown, and the corresponding end of drive member 40 is connected to a suitable operating lever or other control, not shown, which is adapted to actuate the member 40 relative to sheath 38. At its opposite end sheath 38 is secured to forward wall 26 of chamber 12 by means of sheet metal clamps 41 and 42. At its inner end 44, wire drive member 40 is pivotally connected to a downwardly extending bracket 46 formed at one edge of closure 28. By linear actuation of wire drive member 40, closure 28 is swingably withdrawn from opening 10 to permit passage of air through scoop 4 into chamber 12.

Since water as well as air may enter scoop 4 when the vehicle is operated during rainy weather, chamber 12 is provided with a centrifugal or velocity trap 48 which separates particles of water from the air as it passes through the chamber 12 into the vehicle passenger compartment. As seen in Figs. 3 and 4, the rear portion of chamber 12 is provided with a transversely extending curved sheet metal wall section or baffle 50 which extends downwardly and forwardly and returns upwardly to terminate in a curled forward edge 52. A rearwardly curved sheet metal wall 54 is secured, as by welding, on the underside of closure 28. When closure 28 is in the closed position, the lower edge 56 of wall 54 abuts the curled forward edge 52 of wall 50. To prevent rattling between walls 50 and 54, edge 56 is provided with a rubber bumper 58. When closure 28 is moved to open position, wall 54 moves forwardly and downwardly until the edge 56 abuts the lower wall 60 of chamber 12 forwardly of the vertically directed opening 62 formed therein. Therefore, air entering scoop 4 passes through opening 10 and follows the curved wall 50 which redirects the air flow upwardly against the bottom surface of closure 28. Closure 28, in turn, again reverses the direction of air flow downwardly through opening 62 into the interior of the vehicle body. Because of the abrupt and severe change of direction of air flow in chamber 12, water particles are separated from the air by centrifugal force. As water collects in the bottom of trap 48, it is discharged through a drain pipe 64 formed in the bottom wall 60 of chamber 12. A flexible hose 66 is connected to pipe 64 and extends downwardly through the body to a convenient discharge point exterior of the body.

While but one embodiment of the invention has been shown and described, it will be apparent that other changes and modifications will be made therein. It will, therefore, be understood that it is not intended to limit the invention to the embodiment shown but only by the scope of the claims which follow.

We claim:

1. Ventilating device for automotive vehicles or the like comprising: means forming an opening in the vehicle body, means within the vehicle body providing a box-like chamber open to said opening and including an air outlet and a water drain, a baffle rigidly secured to the rear edge of said opening and extending downwardly and forwardly and returning upwardly to receive air against the inner portion thereof, said baffle having an opening therein adjacent said drain, a displaceable closure for said first opening movable between open and closed positions, means mounting said closure adjacent the opening in the vehicle body, a second baffle secured to the closure with the respective baffle concave portions in a facing relationship, said second baffle extending forwardly and downwardly and having its outer end engaging said first baffle when the closure is in a closed position and having said outer end spaced from said first baffle providing communication between first said opening and said outlet when the closure is moved to the open position, and closure operating means moving said closure to open and closed positions.

2. Ventilating device for automotive vehicles or the like comprising: means forming an opening in the vehicle body, means within the vehicle body providing a box-like chamber open to said opening and including an air outlet and a water drain, a baffle rigidly secured to the rear edge of said opening and extending downwardly and forwardly and returning upwardly to receive air against the inner portion thereof, said baffle having an opening therein adjacent said drain, a closure member for said first opening hingedly mounted at its forward edge along the forward edge of said first opening and movable between open and closed positions, a second baffle secured to the closure with the respective baffle concave portions in a facing relationship, said second baffle extending forwardly and downwardly and having its outer end engaging said first baffle when the closure is in a closed position and having said outer end spaced from said first baffle providing communication between first said opening and said outlet when the closure is moved to the open position, and closure operating means moving said closure to open and closed positions.

References Cited in the file of this patent

UNITED STATES PATENTS

| 1,474,075 | Gallaugher | Nov. 13, 1923 |
| 1,643,966 | Swartwout | Oct. 4, 1927 |
| 1,948,283 | Boca | Feb. 20, 1934 |
| 2,279,369 | Findley | Apr. 14, 1942 |
| 2,367,904 | Ulrich | Jan. 23, 1945 |
| 2,476,368 | Guernsey | July 19, 1949 |

FOREIGN PATENTS

| 887,310 | Germany | Aug. 20, 1953 |